United States Patent [19]

Shtipelman et al.

[11] Patent Number: 4,893,206
[45] Date of Patent: Jan. 9, 1990

[54] PIVOTING RADIAL ACCESS MECHANISM WITH SPINNING SUPPORT SHAFT

[75] Inventors: Boris A. Shtipelman, Rochester; David L. White, Penfield, both of N.Y.

[73] Assignee: Eastman Kodak Company, Rochester, N.Y.

[21] Appl. No.: 225,425

[22] Filed: Jul. 28, 1988

[51] Int. Cl.$^4$ .............................................. G11B 21/08
[52] U.S. Cl. ................................................... 360/106
[58] Field of Search ................ 360/106, 102, 105, 104

[56] References Cited

U.S. PATENT DOCUMENTS 4,682,255 7/1987 Sleger et al. ...................... 360/106
4,805,055 2/1989 Wright ............................... 360/106

OTHER PUBLICATIONS

Johnson et al., "Small Modular/Linear Voice Coil Actuator", IBM TDB, vol. 21, No. 11, Apr. 1979, 4632-3.

Primary Examiner—John H. Wolff
Assistant Examiner—Matthew J. Bussan
Attorney, Agent, or Firm—Warren W. Kurz

[57] ABSTRACT

Apparatus for controlling the radial position of a transducer (e.g. an optical, magneto-optic, or magnetic write/read head) relative to a spinning disk (e.g. a data storage disk) comprises a transducer-supporting radial access arm which is mounted via a rotary bearing for pivotal movement about a spinning support shaft. The continuous rotary movement of the support shaft dramatically reduces stick-slip friction in the bearings separating the support shaft and the access arm, thereby reducing start-up torque and enabling more precise positioning of the transducer relative to the disk. Moreover, it prolongs the life of the rotary bearing in that it eliminates so-called Brinelling (wearing of the bearing balls or rollers due to small oscillations about the same point).

3 Claims, 2 Drawing Sheets

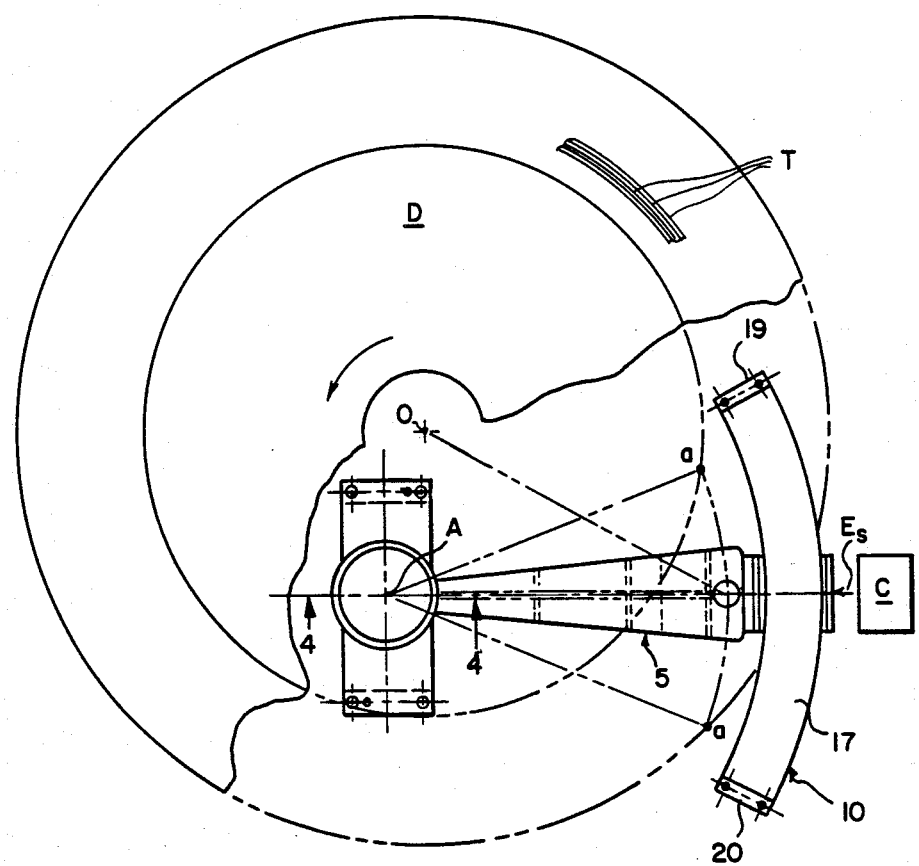
FIG. 1
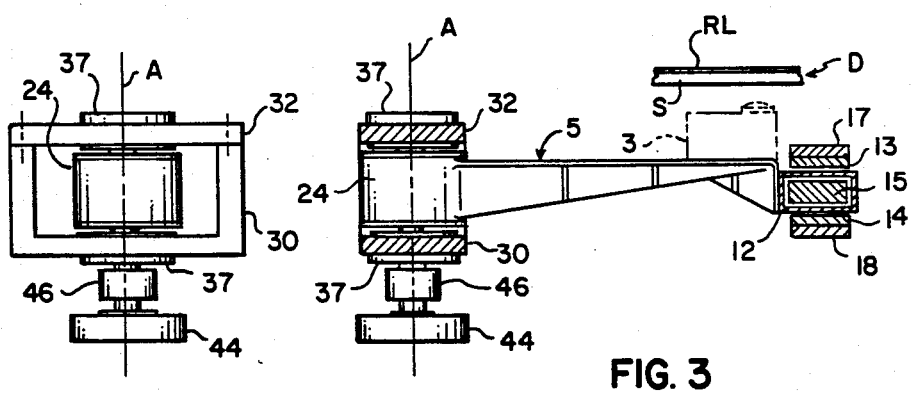
FIG. 2
FIG. 3

PIVOTING RADIAL ACCESS MECHANISM WITH SPINNING SUPPORT SHAFT

BACKGROUND OF THE INVENTION

The present invention has utility in the field of data recording and playback. It is useful, for example, in controlling the radial position of a write/read head relative to the recording surface(s) of a data storage disk (e.g. magnetic, magneto-optic, and optical disks) so that information can be written on (or read from) a desired data track.

Heretofore, a variety of radial access mechanisms have been proposed and utilized to control the radial position of a write/read head relative to a data storage disk. Typically, such mechanisms function to advance the write/read head along straight or circular trajectories in a plane parallel to the plane of disk rotation. For straight head motion, both stepping and linear motors of various designs have been used. With a stepping device, the rotary motion of the motor shaft is commonly converted to linear motion by a lead screw, rack and pinion combination, or quite often by a split band wrapped around the motor shaft. For a linear motor, such as a voice-coil motor, its motion is directly coupled to a movably-mounted carriage which supports the head. Voice-coil motors are also used in circular trajectory schemes where a rotary arm carrying the head turns about a pivot. Regardless of the driving scheme, however, the head carriage is suspended in most cases by a number of bearings or bushings that require precise alignment and high precision in parts manufacture to avoid the problems associated with backlash and friction. Even with those requirements fulfilled, execution of a discrete submicron translation (typical for recording and reading data when the track density is extremely high) cannot be easily achieved. This may be attributed, in part, to the relatively high start-up torque required to overcome the stick-slip friction which is characteristic of any bearing operation. Also, it is complicated by the fact that the so-called Brinelling effect shortens the bearing's life when the bearing balls or rollers are subjected to small oscillations about the same point. Furthermore, internal clearances present in any bearing assembly may cause dynamic problems.

One attempt to resolve the above problems was made by developing the so-called "gyro gimbal" bearings, now offered by several different manufacturers. Their design consists of a three-ring assembly comprising a single row bearing positioned within a rigid double row bearing with closely controlled radial and axial play. While the outer ring with an enlarged flange provides accurate mounting to the stationary structure, the inner ring supports the gimbal. These specially designed gimbal bearings, however, are quite small and cannot be easily utilized in disk drive mechanisms.

SUMMARY OF THE INVENTION

In view of the foregoing, an object of this invention is to provide an improved radial access mechanism of the pivoting arm type, one that is improved at least from the standpoints that it (a) requires comparatively low start-up torque and (b) exhibits reduced backlash and bearing wear.

The radial access mechanism of the invention comprises a transducer-supporting radial access arm, bearing means for mounting such arm for pivotal movement about a support shaft, and means for controlling the movement of the arm about such support shaft to control the radial position of the transducer relative to a spinning disk. These elements of the invention are complemented by means for rotatably supporting the support shaft, and by drive means operatively connected to the support shaft for continuously rotating such shaft, even when the radial access arm is stationary. By keeping the support shaft in constant rotary motion, the start-up torque is reduced, and bearing wear due to Brinelling is diminished.

The invention and its various advantages will become more apparent to those skilled in the art from the ensuing detailed description of preferred embodiments with reference being made to the accompanying drawings.

BRIEF DESCRIPTION OF THE DRAWINGS

FIG. 1 is a top plan view of a radial access mechanisms embodying the invention;

FIGS. 2 and 3 are end and side views, respectively, of the mechanism shown in FIG. 1.

DETAILED DESCRIPTION OF PREFERRED EMBODIMENTS

Figure 4:
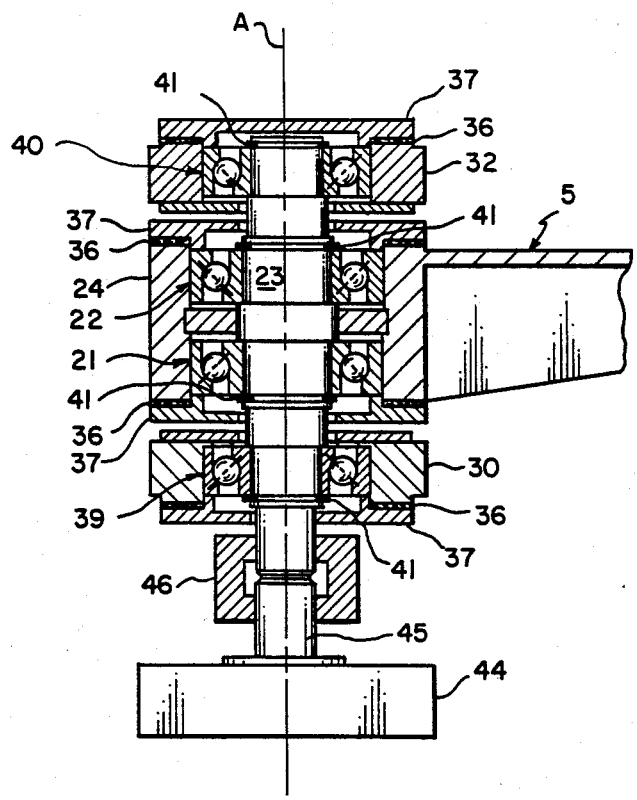
FIG. 4 is a partial sectional view of the FIG. 1 apparatus taken along the section line 4—4.

Referring to the drawings, a preferred embodiment of the radial access apparatus of the present invention is shown in combination with a rotating data storage disk D, a portion of the disk being cut-away to expose the underlying apparatus of the present invention. Data storage disk D may, for example, be of the optical or magneto-optical varieties, comprising a transparent substrate S having an overlying recording layer RL (FIG. 2). Data is recorded on such disks along closely spaced, concentric tracks T, and access to the data recorded along a desired track is achieved by advancing a transducer 3, in this case an optical or magento-optic write/read head, along a path which crosses each of the data tracks.

According to the invention, movement of transducer 3 along an arcuate path a—a to access the data recorded along tracks T is achieved by a radial access arm 5 which is mounted for pivotal movement about axis A. Arm 5 supports transducer 3 so that during pivotal movement of the arm, transducer traverses arc a—a. Preferably, the pivot axis A is located so that the transducer angular orientation is maintained within some allowable limits relative to each data track on the disk as the transducer moves along its circular path from the innermost to the outermost data track. Pivotal movement of the radial access arm is controlled, in a conventional manner, by a voice-coil motor 10. The latter comprises a coil 12 of rectangular cross-section, and a pair of arcuately shaped permanent magnets 13, 14 which define permanent magnetic field transverse to the coil axis. The coil surrounds a metal core 15 of high magnetic permeability, and is rigidly connected to the access arm. The permanent magnetic members 13, 14 are supported and contained by an arcuately shaped housing comprising upper and lower plates 17, 18, and end plates 19, 20. Movement of the coil within the magnetic field is controlled by an electrical signal $E_S$ provided by a control circuit C.

In accordance with the present invention, the pivotal mounting of access arm 5 about axis A is effected by the combination of a pair of rotary angular contact bearings 21, 22, and a rotatably driven pivot shaft 23. (See FIG.

4) The bearings are of conventional design, each comprising inner and outer races with bearing balls therebetween. The outer races of bearings 21 and 22 are press fit in a cylindrical sleeve 24 which is either rigidly coupled to or integrally formed with the access arm 5. The inner races of bearings 21, 22 are press fit about pivot shaft 23 and are thereby adapted to rotate with the pivot shaft. The pivot shaft is supported for rotation by a pair of angular contact bearings 39, 40, supported by frame members 30 and 32, respectively. Pivot shaft 23 is continuously, rotatably driven by a motor 44 having a drive shaft 45 whose rotary motion is coupled to shaft 23 by a coupling 46.

Unlike conventional pivot structures where either outer or inner bear race is stationary, the pivot arrangement of this invention maintains such a stationary race in constant rotation. In other words, independently of the motion of radial access arm 5 by voice-coil motor 10, shaft 23 of the pivot assembly rotates at all times by motor 44, together with the inner races of bearings 21 and 22. Internal clearances and preloading can be adjusted in these bearing assemblies by varying the thickness of ground shims 36 which are held in place by bearing cups 37. Snap rings 41 serve to resist shock and vibratory loads in the bearing assemblies.

As a result of the pivotal mounting scheme described above, stick-slip friction is drastically reduced between shaft 23 and the ball bearings 21 and 22 supported by the radial access arm. Moreover, the lifetime of the bearings is increased in that the Brinelling effect is eliminated.

The invention has been described in detail with particular reference to a certain preferred embodiment thereof, but it will be understood that variations and modifications can be effected within the spirit and scope of the invention.

We claim:

1. Apparatus for controlling the radial position of a transducer relative to a spinning disk, said apparatus comprising a radial access arm for supporting such transducer; and means for mounting said arm for pivotal movement in a plane parallel to the disk plane, such movement serving to move the transducer along an arcuate path over the disk surface, said mounting means comprising:
    (a) bearing means mounted on said arm at a location spaced from the transducer;
    (b) a support shaft journalled for rotation in said bearing means;
    (c) means for rotatably supporting said support shaft;
    (d) drive means for continuously rotatably driving said support shaft in said shaft-supporting means to minimize rotational static friction between said shaft and said bearing means; and
    (e) means for controlling the pivotal position of said radial access arm about said continuously rotating support shaft independently of the rotation of said support shaft.

2. The apparatus as defined by claim 1 wherein said controlling means comprises a voice coil motor.

3. The apparatus as defined by claim 1 wherein said bearing means comprises at least one rotary bearing having concentrically arranged inner and outer races with rotatable bearing members therebetween, and wherein the inner race of said bearing means is rigidly coupled to said support shaft, and the outer race of said bearing means rigidly connected to said arm.

* * * * *